United States Patent
Anderson et al.

(10) Patent No.: US 7,290,221 B2
(45) Date of Patent: Oct. 30, 2007

(54) USER INTERFACE, METHOD AND APPARATUS FOR PROVIDING THREE-DIMENSIONAL OBJECT FABRICATION STATUS

(75) Inventors: Daryl E. Anderson, Corvallis, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 10/417,741

(22) Filed: Apr. 16, 2003

(65) Prior Publication Data

US 2004/0207662 A1    Oct. 21, 2004

(51) Int. Cl.
*G06F 13/00* (2006.01)
*G06F 15/00* (2006.01)

(52) U.S. Cl. .................................. 715/848; 715/850

(58) Field of Classification Search .......... 715/848–850, 715/852, 836, 837; 345/419, 582, 589, 583
See application file for complete search history.

(56) References Cited

U.S. PATENT DOCUMENTS

| | | | |
|---|---|---|---|
| 5,301,348 A | | 4/1994 | Jaaskelainen |
| 6,165,406 A | * | 12/2000 | Jang et al. .................. 264/308 |
| 6,414,697 B1 | | 7/2002 | Amro et al. |
| 2003/0189568 A1 | * | 10/2003 | Alkouh ...................... 345/422 |

OTHER PUBLICATIONS

Z402 User's Manual, Version 4.0, http://www.me.umn.edu/support/mdpl/zcorp/Ver-40-Manual.PDF (downloaded Jan. 04, 2003).

* cited by examiner

*Primary Examiner*—Cao (Kevin) Nguyen

(57) ABSTRACT

A method for providing three-dimensional object fabrication status includes the steps of: receiving data pertaining to three-dimensional object(s) fabrication progress; and controlling a graphical user interface to provide a visual representation of the three-dimensional object(s) fabrication progress in the form of one or more progressively filled-in wireframe model representations of the three-dimensional object(s).

30 Claims, 3 Drawing Sheets

USER INTERFACE, METHOD AND APPARATUS FOR PROVIDING THREE-DIMENSIONAL OBJECT FABRICATION STATUS

BACKGROUND OF THE INVENTION

Three-dimensional (3D) objects fabrication techniques, such as solid freeform fabrication (SFF) and layer manufacturing (LM), allow a 3D object to be built layer-by-layer or point-by-point without using a pre-shaped tool (die or mold). Typically, data representing the geometry or shape of an object to be fabricated are used to control a fabrication tool to build the object.

Layer additive SFF techniques involve depositing a material to form predetermined areas of a layer, either point-by-point or by depositing multiple points at the same time (e.g., employing a multiple-nozzle inkjet-printing technique). Successive layers are then deposited and each is affixed to its adjacent layers for forming a desired 3D object.

An example of another layer additive technique is a 3D powder printing technique, e.g., U.S. Pat. No. 5,204,055 to Sachs, et al., which involves dispensing a layer of loose powders onto a support platform and using an inkjet to spray a computer-defined pattern of liquid binder onto a layer of uniform-composition powder. The binder bonds together the powder particles on the areas defined by the pattern. Powder particles in the unwanted regions remain loose or separated from one another and are removed at the end of the build process. Additional layers of powder are subsequently spread over the preceding layer(s), and the process is repeated.

The selected laser sintering or SLS technique, e.g., U.S. Pat. No. 4,863,538 to C. Deckard, involves spreading a full layer of loose powder particles and uses a computer-controlled, high-power laser to partially melt the powder particles at predetermined spots. Commonly used powders include thermoplastic particles or thermoplastic-coated metal and ceramic particles. The procedures are repeated one layer at a time for each subsequent layer according to the Computer Aided Design (CAD) data of the sliced part geometry. The loose powder particles in each layer are allowed to stay as part of a support structure.

Depending upon the size and complexity of a 3D object, the fabrication process can take a significant amount of time. Given the multi-tasking computing activities typical of modern manufacturing and business environments, it would be valuable to be able to provide users of 3D object fabricator systems with a 3D object building/printing experience that is more user friendly. It would be helpful to be able to provide operators of 3D object fabricators with a user interface that provides good visibility of 3D object fabrication job status. It would also be helpful to be able to provide operators of such systems with a real time indication of job progress. It would also be helpful to be able to provide an indication of 3D object fabrication progress that does not prevent the user from continuing to work on other tasks in parallel with monitoring the 3D object fabrication.

BRIEF DESCRIPTION OF THE DRAWINGS

Detailed description of embodiments of the invention will be made with reference to the accompanying drawings.

DETAILED DESCRIPTION

The following is a detailed description for carrying out the invention. This description is not to be taken in a limiting sense, but is made merely for the purpose of illustrating the general principles of the invention.

The present invention pertains to a user interface, method and apparatus for providing three-dimensional object fabrication status in the form of a progressively filled-in wireframe model representation of the three-dimensional object. In various embodiments of the present invention, data pertaining to the fabrication of one or more three-dimensional objects is received and used to control a graphical user interface to provide a visual representation of the three-dimensional object(s) fabrication progress in the form of one or more progressively filled-in wireframe model representations of the three-dimensional object(s).

Figure 1:
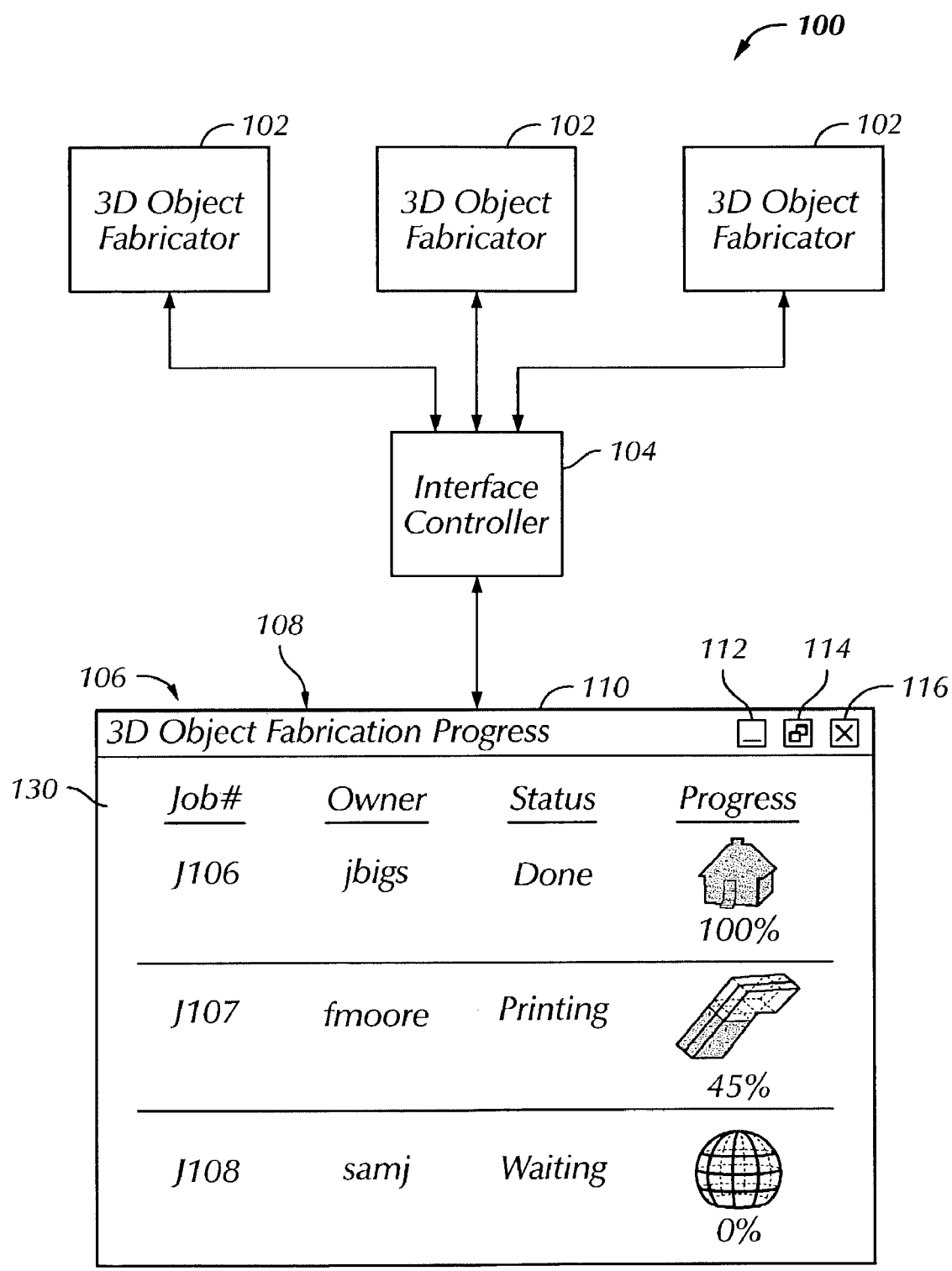
FIG. 1 illustrates an interface controller and graphical user interface for providing three-dimensional object fabrication status according to an embodiment of the present invention.

Referring to FIG. 1, an exemplary 3D object fabrication and monitoring system 100 includes one or more 3D object fabricators 102, an interface controller 104 and a monitor 106 configured as shown. By way of example, the 3D object fabricators 102 can include devices that employ one or more of the following techniques: SFF, LM, fused deposition modeling (FDM), Shape Deposition Manufacturing (SDM), inkjet rapid prototyping, 3D printing (3D-P), and SLS. It should be appreciated that the principles of the present invention are equally applicable to object fabrication technologies other than those explicitly set forth herein.

The interface controller 104 is configured to receive and process data pertaining to three-dimensional object(s) fabrication and to control a graphical user interface 108 (presented at the monitor 106, in this example) to provide a visual representation of progress of the three-dimensional object(s) fabrication in the form of one or more progressively filled-in wireframe model representations of the three-dimensional object(s). The interface controller 104 can be realized via one or more processors, controllers, or the like. The data pertaining to three-dimensional object(s) fabrication can be received, for example, in the form of a Computer Aided Design (CAD) file.

The interface controller 104 can take the form of a print server which receives print job progress information from the printer(s) and then provides this information to the user's computer via web pages or other active (real time) windows. After each pass of the printheads, the printer updates a status register. The status register has a "pass number" which is the number of passes completed by the printhead. The print server (and/or driver), which preferably has already rendered a 3D wireframe model representation of the 3D object being printed, calculates how many passes are required to complete the job. At a specified interval, the server polls the printer for the pass number. After each polling, the 3D wireframe model representation is re-rendered to show the completed portion as a filled-in (e.g., solid colored) area. It should be noted that the printer can "push" the pass information to the server, as well as having the server "pull" it. Alternatively, the above-described functionality can be implemented via the printer driver (i.e., the print server is not used to perform these functions).

The graphical user interface 108 is generated employing, for example, a graphical user interface (GUI) builder. In various embodiments of the present invention, the interface controller 104 is configured to control the graphical user interface 108 such that portions of the wireframe model representations of the three-dimensional object(s) are filled in to provide a visual indication of percentage of three-dimensional object(s) fabrication completed. In the illustrated exemplary embodiment of FIG. 1, the graphical user interface 108 has a top header or tool bar section 110 entitled "3D OBJECT FABRICATION PROGRESS" which includes a minimize icon 112, a maximize icon 114 and a close application icon 116. These icons are actuated employing a user input mechanism such as a keyboard, mouse, voice activation, etc. The graphical user interface 108 also has a main section 130 with "Job#", "Owner", "Status" and "Progress" (or similar) column headings under which information in the form of human-readable indicia and/or visual representations are provided for each 3D object fabrication. In the illustrated example, Job# J106 for jbigs is 100% completed and therefore its Status is "done". Job# J107 for fmoore is 45% completed and its Status is "printing". Job# J108 for samj is 0% completed and "waiting" to begin. Thus, in various embodiments of the present invention, the interface controller 104 is configured to control the graphical user interface 108 such that the visual representation additionally includes human-readable indicia which can, but does not necessarily, pertain to the progress of the three-dimensional object(s) fabrication.

Under the "Progress" column, wireframe model representations of the three-dimensional objects for Job#s J106-J108 are filled in as a function of the three-dimensional objects fabrication progress. By way of example, the interface controller 104 is configured to control the graphical user interface 108 such that the wireframe model representations are progressively filled in with one or more colors defining filled-in portions of the wireframe model representations. The one or more colors can be opaque or translucent. Alternatively, shades of gray can be used instead of colors. The coloring of the surfaces can also have shading, cross-hatching, and/or other visual cues to render the image more lifelike or convey status information. As portions of the wireframe model representations are filled in, the "wires" associated with the filled-in portions can remain visible or disappear, and/or surface texture(s) appropriate for the object(s) being fabricated can be applied to the filled-in portions. Moreover, the wireframe model representations can be adjusted in shape to provide a three-dimensional "feel" (linear perspective).

Various other graphical representations of three-dimensional object fabrication progress (e.g., providing an eye-catching visual representation) also fall within the scope of the present invention. In one embodiment, the interface controller 104 is configured to control the graphical user interface 108 such that the filled-in portion(s) transition(s) from one color to another, for example, while the 3D object fabrications are in progress. In another embodiment, the interface controller 104 is configured to control the graphical user interface 108 such that the filled-in portion(s) pulsate(s). In another embodiment, the interface controller 104 is configured to control the graphical user interface 108 such that the filled-in portion(s) pulsate(s) at rates depending upon the progress of the 3D object(s) fabrication. By way of example, the pulse rate of the filled-in portion is increased as the fabrication gets closer to completion. In another embodiment, different visual representations of object fabrication progress (such as 0%, 25%, 50%, 75% and 100% completion) are presented once particular object fabrication progress "milestones" are reached.

Figure 3A:
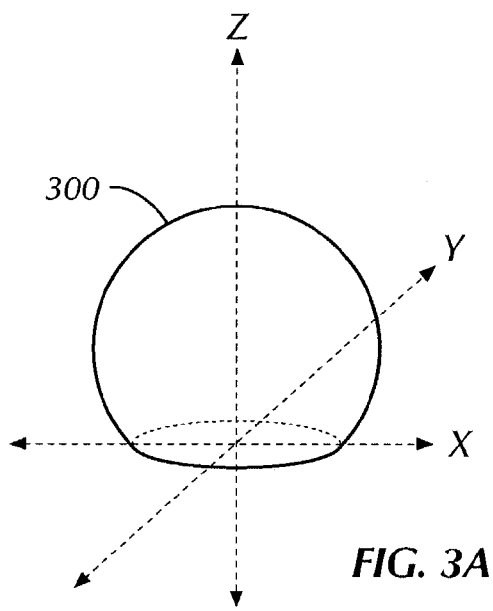
FIG. 3A illustrates a mathematical representation of an exterior surface of a three-dimensional object.
Figure 3B:
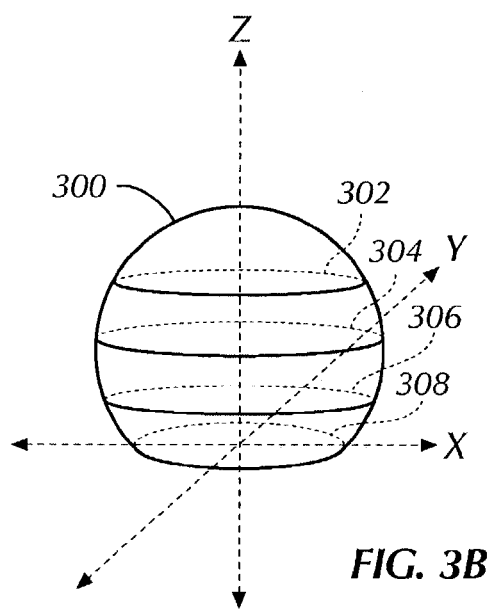
FIG. 3B illustrates an example of how a wireframe model representation of the three-dimensional object of FIG. 3A is created by slicing the exterior surface in planes parallel the x-y plane.
Figure 3C:
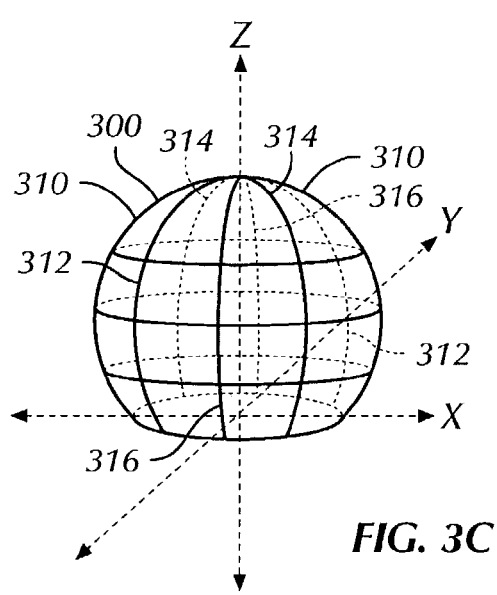
FIG. 3C illustrates a further step in creating a wireframe model representation of the three-dimensional object of FIG. 3A by additionally slicing the exterior surface in planes perpendicular to the x-y plane.
Figure 3D:
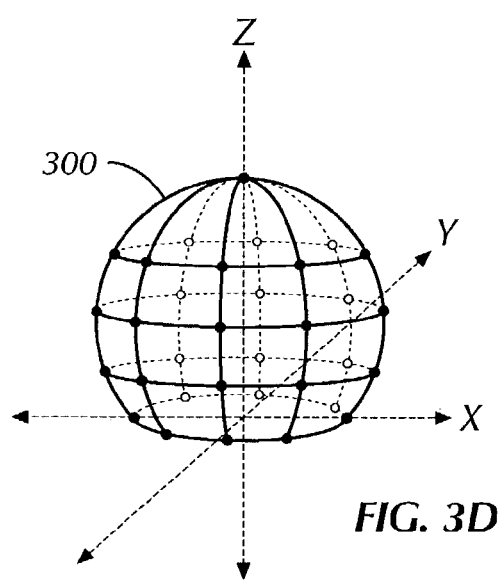
FIG. 3D illustrates a further step in creating a wireframe model representation of the three-dimensional object of FIG. 3A by defining vertices of the wireframe model representation as being located at coordinates along the exterior surface where the planes in FIG. 3C intersect each other.

A variety of techniques can be employed to generate the wireframe model representations. By way of example, FIG. 3A illustrates a mathematical representation (in a x-y-z coordinate system) of an exterior surface 300 of a three-dimensional object. Referring to FIG. 3B, a wireframe model representation of the three-dimensional object is created by slicing the exterior surface 300 in planes 302, 304, 306 and 308, which are parallel to the x-y plane. FIG. 3C illustrates a further step in creating the wireframe model representation by additionally slicing the exterior surface 300 in planes 310, 312, 314 and 316 (shown in dashed lines), which are perpendicular to the x-y plane. FIG. 3D illustrates a further step in creating the wireframe model representation by defining vertices of the wireframe model representation as being located at coordinates (shown as dots) along the exterior surface 300 where the planes 302, 304, 306, 308, 310, 312, 314 and 316 intersect each other. Once the vertices have been defined, they are interconnected with "wires" (e.g., horizontal lines that fall within the planes 302, 304, 306 and 308 and vertical lines that fall within the planes 310, 312, 314 and 316) to form the wireframe model representation. Although four horizontal and four vertical planes ("slices") are shown in this example, it should be appreciated that more or less resolution in approximating the exterior surface of the 3D object can be effected by increasing or decreasing the number of slices. Other variations of the foregoing wireframe model representation generation technique can also be employed. For example, the described methodology for determining the locations of the vertices and/or the way that they are interconnected can be varied.

Thus, in various embodiments of the present invention, the interface controller 104 (FIG. 1) is configured to control the graphical user interface 108 such that outer surfaces of the progressively filled-in wireframe model representations are defined by interconnected vertices which are located at coordinates corresponding to mathematical representations of exterior surfaces of the three-dimensional objects.

In another embodiment of the present invention, a method for providing three-dimensional object fabrication status includes the steps of: monitoring three-dimensional object(s) fabrication progress at one or more solid freeform fabrication (SFF) devices; and generating a visual representation of the three-dimensional object(s) fabrication progress including one or more wireframe model representations of the three-dimensional object(s) which are filled in as a function of the three-dimensional object(s) fabrication progress. Vertices of the wireframe model representations can be, but are not necessarily, located at coordinates corresponding to mathematical representations of exterior surfaces of the three-dimensional objects.

Figure 2A:
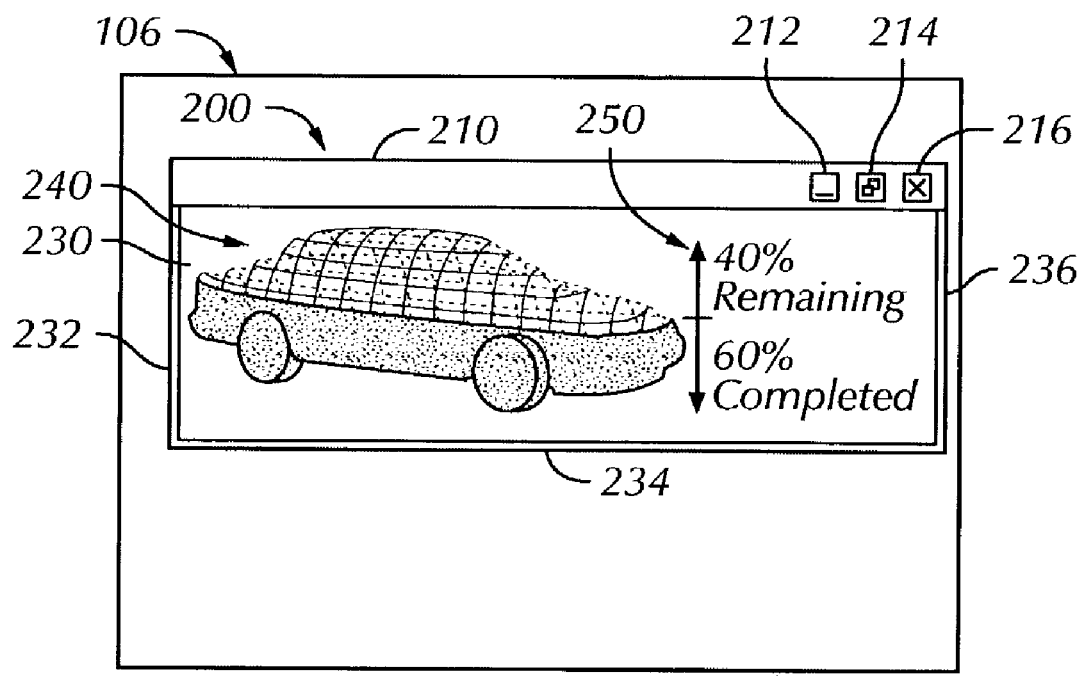
FIG. 2A illustrates an example of a visual representation of progress in the fabrication of a three-dimensional object in the form of a progressively filled-in wireframe model representation of the three-dimensional object.

In another embodiment of the present invention, the interface controller 104 is configured to control the graphical user interface 108 to allow a user to select one of the wireframe model representations (e.g., by double-clicking over it with a mouse) and to generate a "dedicated visual representation" pertaining to the fabrication progress of only the three-dimensional object corresponding to the selected wireframe model representation. Referring to FIG. 2A, an example of such a dedicated visual representation 200 has a top header or tool bar section 210 which includes a minimize icon 212, a maximize icon 214 and a close window icon 216. These icons are actuated employing a user input mechanism such as a keyboard, mouse, voice activation, etc. The dedicated visual representation 200 also has a main section 230, in which the selected wireframe model representation 240 is presented. In a preferred embodiment, the dedicated visual representation 200 also has a left border 232, a bottom border 234 and a right border 236 which are positioned around the main section 230 as shown. Optionally, human-readable indicia 250 are also presented in conjunction with the selected wireframe model representation 240. In FIG. 2A, the example selected wireframe model representation 240 is a partially-filled wireframe model representation of a car, the fabrication of which is 60% completed (as also indicated by the human-readable indicia 250).

Thus, in an embodiment of the present invention, a method for providing three-dimensional object fabrication status includes the steps of: receiving data pertaining to three-dimensional object(s) fabrication progress; controlling a graphical user interface to provide a visual representation of the three-dimensional object(s) fabrication progress in the form of one or more progressively filled-in wireframe model representations of the three-dimensional object(s); and controlling the graphical user interface to allow a user to select one of the wireframe model representations and to generate a dedicated visual representation pertaining to the fabrication progress of only the three-dimensional object corresponding to the selected wireframe model representation.

Figure 2B:
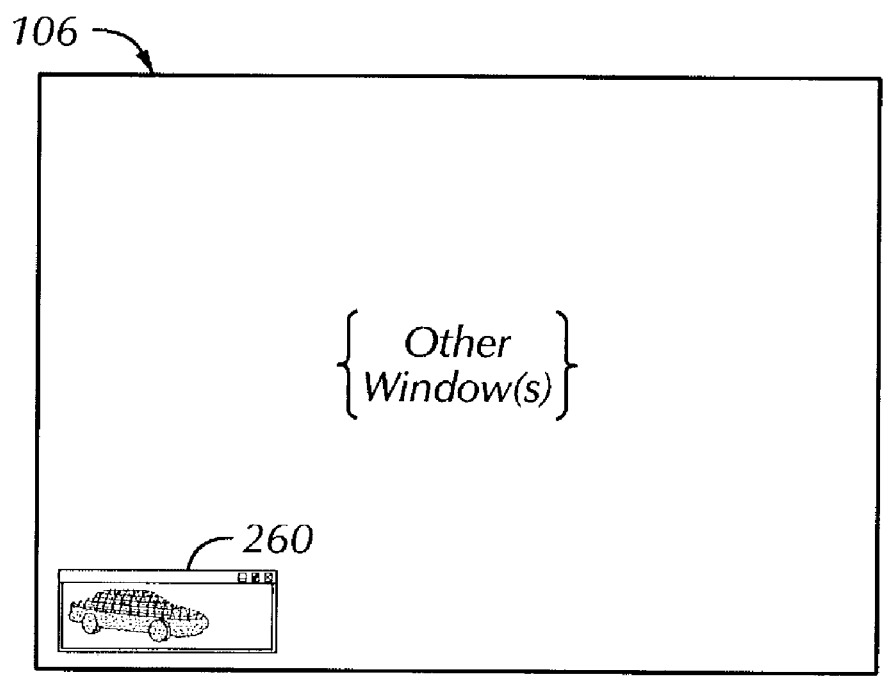
FIG. 2B illustrates an example of a resized and repositioned version of the visual representation of FIG. 2A.

In various other embodiments, the interface controller 104 (FIG. 1) is configured to control the graphical user interface 108 to allow the user to resize and/or reposition the dedicated visual representation 200 within a display area (such as the monitor 106). For example, a user can reposition the dedicated visual representation 200 within the monitor 106 by "grabbing and dragging" the top header or tool bar section 210. Similarly, a user can resize the dedicated visual representation 200 as desired by "grabbing and dragging" one or more of the left border section 232, the bottom border 234 and the right border 236. Furthermore, by actuating the minimize icon 212, the dedicated visual representation 200 is reduced to a small window 260 (FIG. 2B) for ongoing monitoring of the build progress while still working in other windows. Accordingly, various embodiments of the present invention accommodate providing a visual representation of 3D object fabrication progress while simultaneously allowing the viewer to use other software programs such as word processors, browsers, etc.

In another embodiment of the present invention, an apparatus for providing three-dimensional object fabrication status includes: a data interface configured to receive, from one or more solid freeform fabrication (SFF) systems, data pertaining to a three-dimensional object(s) fabrication task; and a mechanism for processing the data to generate output signals that cause a display to generate a visual representation of progress of the three-dimensional object(s) fabrication task in the form of one or more wireframe model representations of the three-dimensional object(s) which are progressively filled to visually indicate fabrication task progress for each three-dimensional object. The data interface and data processing mechanism can both be implemented in the interface controller 104, or their respective functionalities can be distributed in some other manner, e.g., to accommodate the requirements and/or constraints of a particular application.

In another embodiment of the present invention, a method for providing three-dimensional object fabrication status includes the steps of: processing data pertaining to a three-dimensional object(s) fabrication task for one or more solid freeform fabrication (SFF) devices, the data including fabrication task progress information; controlling a graphical user interface to generate a visual representation of the fabrication task progress information in the form of one or more progressively filled wireframe model representations of the three-dimensional object(s); and repeatedly updating the fabrication task progress information and regenerating the one or more progressively filled wireframe model representations until the fabrication task is completed. In another embodiment, the method further includes the steps of: monitoring user inputs for the graphical user interface to determine whether a user has selected one or more of the wireframe model representations; and controlling the graphical user interface to generate a dedicated visual representation pertaining to the fabrication task progress of only the three-dimensional object corresponding to the selected wireframe model representation. In another embodiment, the method still further includes the step of: controlling the graphical user interface to allow the user to resize and/or reposition the dedicated visual representation within a display area.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method for providing three-dimensional object fabrication status, comprising the steps of:
   monitoring three-dimensional object(s) fabrication progress at one or more solid freeform fabrication (SFF) devices; and
   generating a visual representation of the three-dimensional object(s) fabrication progress including one or more wireframe model representations of the three-dimensional object(s) which are filled in as a function of the three-dimensional object(s) fabrication progress.

2. The method for providing three-dimensional object fabrication status of claim 1, wherein vertices of the wireframe model representations are located at coordinates corresponding to mathematical representations of exterior surfaces of the three-dimensional objects.

3. The method for providing three-dimensional object fabrication status of claim 1, wherein the wireframe model representations are progressively filled in with one or more colors defining filled-in portions of the wireframe model representations.

4. The method for providing three-dimensional object fabrication status of claim 3, wherein the one or more colors are opaque.

5. The method for providing three-dimensional object fabrication status of claim 3, wherein the one or more colors are translucent.

6. The method for providing three-dimensional object fabrication status of claim 3, wherein the visual representation is generated such that the filled-in portion(s) transition(s) from one color to another.

7. The method for providing three-dimensional object fabrication status of claim 3, wherein the visual representation is generated such that the filled-in portion(s) pulsate(s).

8. The method for providing three-dimensional object fabrication status of claim 7, wherein the filled-in portion(s) pulsate(s) at rates depending upon the three-dimensional object(s) fabrication progress.

9. The method for providing three-dimensional object fabrication status of claim 3, wherein the visual representation additionally includes human-readable indicia.

10. The method for providing three-dimensional object fabrication status of claim 9, wherein the human-readable indicia pertains to the three-dimensional object(s) fabrication progress.

11. A method for providing three-dimensional object fabrication status, comprising the steps of:
receiving data pertaining to three-dimensional object(s) fabrication progress; and
controlling a graphical user interface to provide a visual representation of the three-dimensional object(s) fabrication progress in the form of one or more progressively filled-in wireframe model representations of the three-dimensional object(s).

12. The method for providing three-dimensional object fabrication status of claim 11, further comprising the step of:
controlling the graphical user interface to allow a user to select one of the wireframe model representations and to generate a dedicated visual representation pertaining to the fabrication progress of only the three-dimensional object corresponding to the selected wireframe model representation.

13. The method for providing three-dimensional object fabrication status of claim 12, further comprising the step of:
controlling the graphical user interface to allow the user to resize and/or reposition the dedicated visual representation within a display area.

14. An apparatus for providing three-dimensional object fabrication status, comprising:
an interface controller configured to receive and process data pertaining to three-dimensional object(s) fabrication and to control a graphical user interface to provide a visual representation of progress of the three-dimensional object(s) fabrication in the form of one or more progressively filled-in wireframe model representations of the three-dimensional object(s).

15. The apparatus for providing three-dimensional object fabrication status of claim 14, wherein the interface controller is configured to control the graphical user interface such that outer surfaces of the progressively filled-in wireframe model representations are defined by interconnected vertices which are located at coordinates corresponding to mathematical representations of exterior surfaces of the three-dimensional objects.

16. The apparatus for providing three-dimensional object fabrication status of claim 14, wherein the interface controller is configured to control the graphical user interface such that portions of the wireframe model representations are filled in to provide a visual indication of percentage of three-dimensional object(s) fabrication completed.

17. The apparatus for providing three-dimensional object fabrication status of claim 14, wherein the interface controller is configured to control the graphical user interface such that the wireframe model representations are progressively filled in with one or more colors defining filled-in portions of the wireframe model representations.

18. The apparatus for providing three-dimensional object fabrication status of claim 17, wherein the one or more colors are opaque.

19. The apparatus for providing three-dimensional object fabrication status of claim 17, wherein the one or more colors are translucent.

20. The apparatus for providing three-dimensional object fabrication status of claim 14, wherein the interface controller is configured to control the graphical user interface such that the filled-in portion(s) transition(s) from one color to another.

21. The apparatus for providing three-dimensional object fabrication status of claim 14, wherein the interface controller is configured to control the graphical user interface such that the filled-in portion(s) pulsate(s).

22. The apparatus for providing three-dimensional object fabrication status of claim 14, wherein the interface controller is configured to control the graphical user interface such that the filled-in portion(s) pulsate(s) at rates depending upon the progress of the three-dimensional object(s) fabrication.

23. The apparatus for providing three-dimensional object fabrication status of claim 14, wherein the interface controller is configured to control the graphical user interface such that the visual representation additionally includes human-readable indicia.

24. The apparatus for providing three-dimensional object fabrication status of claim 23, wherein the human-readable indicia pertains to the progress of the three-dimensional object(s) fabrication.

25. The apparatus for providing three-dimensional object fabrication status of claim 14, wherein the interface controller is configured to control the graphical user interface to allow a user to select one of the wireframe model representations and to generate a dedicated visual representation pertaining to the fabrication progress of only the three-dimensional object corresponding to the selected wireframe model representation.

26. The apparatus for providing three-dimensional object fabrication status of claim 25, wherein the interface controller is configured to control the graphical user interface to allow the user to resize and/or reposition the dedicated visual representation within a display area.

27. An apparatus for providing three-dimensional object fabrication status, comprising:
a data interface configured to receive, from one or more solid freeform fabrication (SFF) systems, data pertaining to a three-dimensional object(s) fabrication task; and
means for processing the data to generate output signals that cause a display to generate a visual representation of progress of the three-dimensional object(s) fabrication task in the form of one or more wireframe model representations of the three-dimensional object(s) which are progressively filled to visually indicate fabrication task progress for each three-dimensional object.

28. A method for providing three-dimensional object fabrication status, comprising the steps of:
processing data pertaining to a three-dimensional object(s) fabrication task for one or more solid freeform fabrication (SFF) devices, the data including fabrication task progress information;
controlling a graphical user interface to generate a visual representation of the fabrication task progress information in the form of one or more progressively filled wireframe model representations of the three-dimensional object(s); and repeatedly updating the fabrication task progress information and regenerating the one or more progressively filled wireframe model representations until the fabrication task is completed.

29. The method for providing three-dimensional object fabrication status of claim 28, further comprising the steps of:

monitoring user inputs for the graphical user interface to determine whether a user has selected one or more of the wireframe model representations; and controlling the graphical user interface to generate a dedicated visual representation pertaining to the fabrication task progress of only the three-dimensional object corresponding to the selected wireframe model representation.

30. The method for providing three-dimensional object fabrication status of claim 29, further comprising the step of:

controlling the graphical user interface to allow the user to resize and/or reposition the dedicated visual representation within a display area.

* * * * *